US008719239B2

(12) United States Patent
Clemm et al.

(10) Patent No.: US 8,719,239 B2
(45) Date of Patent: May 6, 2014

(54) DISPLAYING CHANGES TO VERSIONED FILES

(75) Inventors: Geoffrey M. Clemm, Concord, MA (US); Paul Komar, Lexington, MA (US); Maneesh Mehra, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/837,569

(22) Filed: Jul. 16, 2010

(65) Prior Publication Data

US 2012/0016867 A1    Jan. 19, 2012

(51) Int. Cl.
*G06F 17/30*    (2006.01)

(52) U.S. Cl.
USPC ............................ 707/695; 707/758; 707/806

(58) Field of Classification Search
USPC .................................. 707/638; 715/784, 866
See application file for complete search history.

(56) References Cited

U.S. PATENT DOCUMENTS

| | | | |
|---|---|---|---|
| 6,185,591 B1 | 2/2001 | Baker et al. | |
| 6,226,407 B1 | 5/2001 | Zabih et al. | |
| 6,300,947 B1 * | 10/2001 | Kanevsky | 715/866 |
| 6,560,620 B1 * | 5/2003 | Ching | 715/229 |
| 6,829,733 B2 | 12/2004 | Richardson et al. | |
| 6,983,331 B1 * | 1/2006 | Mitchell et al. | 709/246 |
| 7,181,684 B2 | 2/2007 | Chittu et al. | |
| 7,539,943 B2 | 5/2009 | Vaidyanathan et al. | |
| 8,225,274 B2 * | 7/2012 | Cowtan | 717/105 |
| 2002/0166081 A1 | 11/2002 | Richardson et al. | |
| 2004/0103124 A1 * | 5/2004 | Kupkova | 707/203 |
| 2005/0044484 A1 | 2/2005 | Makela | |
| 2005/0268248 A1 * | 12/2005 | Boerner et al. | 715/788 |
| 2006/0069808 A1 * | 3/2006 | Mitchell et al. | 709/246 |
| 2006/0101005 A1 * | 5/2006 | Yang et al. | 707/3 |
| 2008/0033753 A1 * | 2/2008 | Canda et al. | 705/2 |
| 2008/0086718 A1 * | 4/2008 | Bostick et al. | 717/120 |
| 2008/0310736 A1 | 12/2008 | Chattopadhyay et al. | |
| 2010/0095239 A1 * | 4/2010 | McCommons et al. | 715/784 |
| 2012/0177291 A1 | 7/2012 | Gronau et al. | |
| 2012/0203768 A1 | 8/2012 | Clemm et al. | |

* cited by examiner

*Primary Examiner* — Mohammad S Rostami
(74) *Attorney, Agent, or Firm* — Cuenot, Forsythe & Kim, LLC (57) ABSTRACT

Presenting changes to versioned files. A first view comprising a plurality of indicators, each of the indicators corresponding to a respective version of a file, can be presented. A selection of a particular version of a file can be detected. A selection of another version of the file can be detected. In response to the selection of the other version of the file, the versions of the file can be compared to identify differences between the versions. Comparison information based on the differences can be generated. The comparison information can be filtered so that the comparison information fits within a second view having a desired size.

10 Claims, 4 Drawing Sheets

DISPLAYING CHANGES TO VERSIONED FILES

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The embodiments disclosed within this specification relate to software configuration management systems. More particularly, the embodiments relate to displaying changes to versioned files.

A software configuration management system (CMS) typically records a set of changes that have occurred to artifacts contained within a file. The resulting file is generally referred to as a particular version. Some CMSs display information about stored versions of files in a graphical manner, for example within a version tree. A version tree usually displays unique version information as a discrete change along with relevant metadata associated with the version.

In some CMSs, a user can select two intersecting versions and request that a comparison of the two versions be presented. In response, a compare editor view may be presented in which the entire contents of both versions are presented, along with differences that are highlighted. Oftentimes the versions that are compared are two immediately consecutive versions, and content removed in previous versions will not be displayed.

BRIEF SUMMARY OF THE INVENTION

The embodiments disclosed within this specification relate to software configuration management systems. More particularly, the embodiments relate to displaying changes to versioned files. One embodiment of the present invention can include a computer readable storage medium having stored thereon computer readable program code that, when executed by a system comprising a processor and a memory, presents changes to versioned files. The computer readable storage medium can include computer readable program code that presents a first view comprising a plurality of indicators, each of the indicators corresponding to a respective version of a file, wherein the plurality of indicators are presented in a hierarchical manner that indicates relationships between the different versions of the file, computer readable program code that detects a selection of a particular version of the file, and computer readable program code that detects a selection of another version of the file. The computer readable storage medium further can include computer readable program code that, in response to the selection of the other version of the file, compares the versions of the file to identify differences between the versions, and generates comparison information based on the differences, determines a desired size of a second view, selectively filters the comparison information to reduce the volume of the comparison information fits within the second view having the desired size, and automatically presents the comparison information within the second view.

Another embodiment of the present invention can include a computer readable storage medium having stored thereon computer readable program code that, when executed by a system comprising a processor and a memory, presents changes to versioned files. The computer readable storage medium can include computer readable program code that detects a selection of a particular version of the file, computer readable program code that detects a selection of another version of the file, computer readable program code that compares the selected versions of the file to identify differences between the versions, and generating comparison information based on the differences, computer readable program code that determines a desired size of a first view in which the comparison information is to be presented, computer readable program code that selectively filters the comparison information to reduce the volume of the comparison information so that the filtered comparison information fits within the first view having the desired size, and computer readable program code that automatically presents the filtered comparison information within the first view.

DETAILED DESCRIPTION OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to displaying changes to versioned files, for example in a software configuration management system (CMS). Within a view presented via a user interface of a computing device, a plurality of indicators can be presented, each of which represents a different version of a file being reviewed. The indicators can be presented in a hierarchical manner that indicates relationships between the different versions of the file, for example within a version tree. A selection of a particular version of the file can be detected, as well as a selection of another version of the file. For example, a user may select a version from the version tree and then select another version within the version tree.

In response, the selected versions of the file can be compared to identify differences between the versions. Based on these differences, comparison information can be generated and automatically presented within a second view presented via the user interface. The comparison information can be automatically filtered to selectively reduce the volume of the comparison information so as to fit within a desired size of the second view. The size of the second view can be a default size or a user selectable size.

Figure 1:
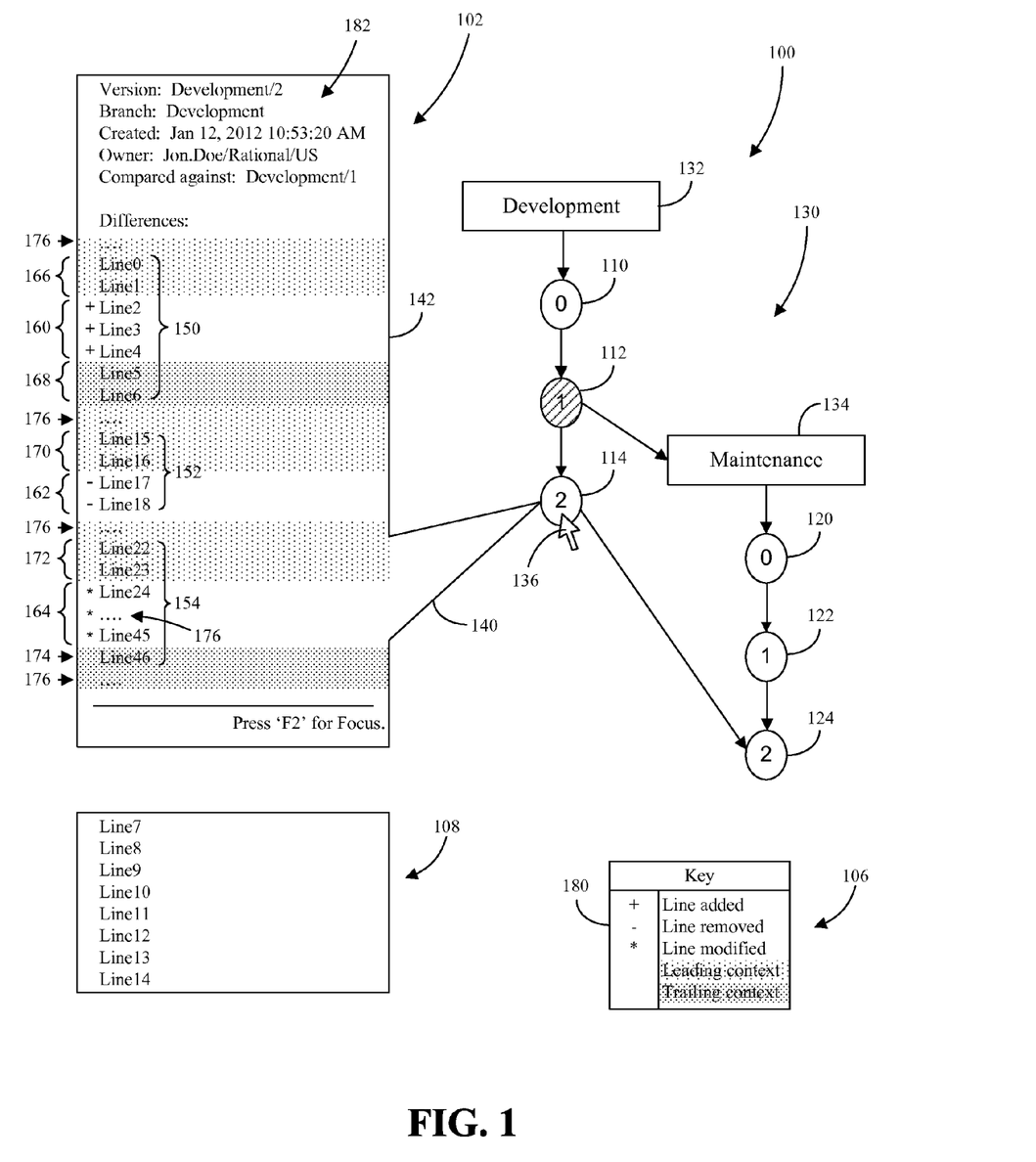
FIG. 1 is a view presented via a user interface in accordance with one embodiment of the present invention.

FIG. 1 depicts views 100, 102 presented via a user interface, for example a user interface of a computer system, in accordance with one embodiment of the present invention. As used herein, a file is block of information, for example program code, which is available to a computer for processing. In one aspect of the invention, a file is a computer application or a component of a computer application. As used herein, a file is not limited to a single instance. In this regard, multiple versions of a file may exist. Although the multiple versions may be stored on the same computer readable storage medium, this need not be the case. For example, different versions of a file may be stored on different computer readable storage mediums and retrieved for comparison purposes when needed. As used herein, a file version is an instance of a file that contains at least some information contained in at least one other instance of the file, but also contains additional information not contained in the other instance, lacks information contained in the other instance and/or contains changes to information contained in the other instance.

The view 100 can present a plurality of indicators, each of which represents a different version of a file being reviewed. For example the view 100 can present indicators 110, 112, 114, each of which are associated with one category of file versions. In addition, the view 100 can present indicators 120, 122, 124, each of which are associated with another category of file versions. The indicators 110-124 can be presented in a hierarchical manner that indicates the categories with which they are associated and relationships between the different versions of the file. For example, the indicators 110-124 can be presented within a version tree 130. In illustration, indicators 132, 134 can be provided to indicate the various categories, or branches, of file versions, and lines can be provided to indicate how the various file versions 110-124 are related to these categories and how the various versions 110-124 are related to one another. Notwithstanding this example, the relationships among the various versions 110-124 and the categories with which they are associated can be indicated in any other suitable manner and the invention is not limited in this regard.

A selection of a particular version of the file can be detected. For example, the indicator 112 can be selected to choose version 1 of the development category. In one arrangement, a user can select the indicator 112 using a cursor 136, for instance by hovering over the indicator 112 and depressing a mouse button. In other arrangements, a user can use a keyboard to navigate to the indicator 112 and to make the selection, select the indicator 112 on a touch screen using an appendage or stylus, or select the indicator 112 in any other suitable manner. As used herein, a user is a person. In one arrangement, an indication can be provided to indicate that the indicator 112 has been selected. For example a color of the indicator 112 can be changed upon the indicator 112 being selected, a shading can be applied to the indicator 112, or the like.

The user then may select another version of the file (second file version) to compare with the version already selected (first file version). At this point it should be noted that, as used herein, ordinal terms (e.g. first, second, third, fourth, fifth, sixth, seventh, eighth, ninth, tenth, and so on) distinguish one file version from another file version. Thus, an ordinal term used herein need not indicate a specific position in an ordinal series. For example, a file version identified as a "second file version" may occur before a file version identified as a "first file version," after the "first file version," or the "second file version" may occur in an entirely different file version category than the "first file version." Moreover, one or more file versions may occur between a first file version and a second file version.

By way of example, the user can select the indicator 114 representing version 2 of the development category. In this case, the version associated with the indicator 114 can be selected merely by hovering the cursor 136 over the indicator 114, although the invention is not limited in this regard. For instance, the user can select the indicator 114 in any suitable manner, for instance as previously described. When the indicator 114 is selected, a color of the indicator 114 can be changed upon the indicator 114 being selected, a shading can be applied to the indicator 114, or the like. If a color of the indicator 114 is changed, the new color can be different than a color applied to the indicator 112, though this need not be the case. Any such indicators also can be applied for the indicator 112.

Also, when the indicator 114 is selected, the other view 102 can be automatically presented to indicate the differences between the selected versions of the file. For example, the view 102 can be presented as a pop up window. An indication can be provided to indicate which version of the file has been selected for comparison to the version associated with the indicator 112. In illustration, the window 102 can be configured to have a feature 140 that extends from the indicator 114 to a main portion 142 of the view 102. The window 102 also can be configured to have a feature (not shown) that extends from the indicator 112 to the main portion 142 of the view 102.

When the indicator 114 is deselected, the view 102 can be closed or minimized. In an arrangement in which the indicator 114 was selected by hovering the cursor 136 over the indicator 114, the indicator can be deselected merely by moving the cursor 136 away from the indicator 114. If the indicator 114 was selected by depressing a mouse button, the indicator 114 can be deselected by again depressing the same mouse button, or depressing another mouse button. Still, the indicator 114 can be deselected in any other suitable manner. If the color of the indicator 114 was changed when the indicator 114 was selected, the color of the indicator 114 can revert back to the original color, or revert to another color so as to indicate that the file version associated with the indicator 114 has already been compared to the file version associated with the indicator 112.

Another indicator, for example the indicator 122, representing yet another version of the file (third version) can be immediately selected, and the view 102 can again be automatically presented. This time, however, the view 102 can indicate the differences between the first file version and the third file version. Accordingly, comparison information representing differences between a particular version of a file and numerous other versions can be quickly viewed by a user in a convenient manner.

In another embodiment, a selected version of the file can be compared to its immediate predecessor as depicted in the version tree 130. In illustration, if the indicator 120 is selected, the file version associated with the indicator 120 can be automatically compared to the file version represented by the indicator 112 to generate the comparison information presented in the view 102. Similarly, if the indicator 122 is selected, the file version associated with the indicator 122 can be compared to the file version associated with the indicator 120.

In the case where a particular file version has two predecessors indicated in the version tree 130, when the indicator associated with the file version is selected, the file version can be compared with one or both of its predecessors. For example, if the indicator 124 is selected, the associated file version can be compared to the file version associated with the indicator 122 and/or the file version associated with the indicator 114. In this regard, the second view 102 can be presented to display one set of comparison information and another view (not shown) can be presented to display another set of comparison information. Alternatively, a message can be presented requesting the user to select which of the previous file versions to use for the comparison. In another embodiment, by default the file version can be compared to its immediate predecessor within the same file version category. For example, the file versions associated with the indicators 122, 124 can be compared.

In yet another embodiment, a file version can be compared to its immediate predecessor, even if that predecessor is not associated with an indicator that is presented in the version tree 130. In illustration, if a file version exists between maintenance versions 1 and 2 associated with the indicators 122, 124, for example a version 1.1, when the indicator 124 is selected, the file version 2 associated with the indicator 124 can be compared to the file version 1.1.

The decision as to which file versions are to be used for comparison can be determined based on a selected operating mode, for example as established by user preferences. In illustration, a user can access a menu of mode options and select any of the previously described file version selection embodiments as a desired mode of operation. The user selection can be saved and applied by default. Of course, the user may change the user preferences when desired. In addition, the user may override a default operating mode, for instance by accessing a menu of file comparison options when the user makes a file version selection.

As noted, the view 102 can comprise comparison information that indicates the differences between the selected versions of the file. For example, chunks 150, 152, 154 of content representing comparison information can be presented in the view 102. As used herein, a chunk is a grouping of content contained within the file. The grouping may be selected in any manner that is convenient for representing the comparison information. In illustration, the chunks 150-154 can include content which has been added, removed and/or modified between the file versions being compared. For example, the chunk 150 can include content 160 that has been added to the file since the earlier of the versions being compared was generated, the chunk 152 can include content 162 that has been removed from the file since the earlier version was generated, and the chunk 154 can include content 164 that has changed since the earlier version was generated.

The chunks 150-154 also can include content which may not be different between the compared versions, but which adds context to the chunks 150-154 of content that are presented within the view 102. For example, the chunk 150 can include content 166, for instance lines of program code, that precedes, or immediately precedes, the content 160, and/or content 168 that follows, or immediately follows, the content 160. Similarly, the chunk 152 can include content 170 that precedes, or immediately precedes, the content 162. The chunk 154 can include content 172 that precedes, or immediately precedes, the content 164, and/or content 174 that follows, or immediately follows, the content 164. Indicators 176, for example ellipses or the like, can be presented within the chunks 150-154 and/or between the chunks 150-154 to indicate locations of content contained within the compared file versions, but which is not presented within the view 102. For instance, the indicators 176 can indicate one or more chunks of content, or content within a chunk, that has been filtered and thus is not presented within the view 102.

In one aspect of the invention, indicators can be presented to identify the content which has been added, removed and/or changed, as well as to identify the contextual content. For example, "+" indicators can be presented with the content 160 to indicate that the content 160 has been added to the file since the earlier of the versions being compared. "−" indicators can be presented with the content 162 to indicate that the content 162 has been removed from the file since the earlier of the versions being compared. "*" indicators can be presented with the content 164 to indicate that the content 164 has been changed since the earlier of the versions being compared.

Further, the content 166-174 that adds context to the chunks 150-154 can be presented with suitable indicators to indicate that such content 166-174 is contextual information. For example, the content 166, 170, 172 that precede the respective content 160-164 can be presented with a particular effect, such as color or shading applied to the content 166, 170, 172, or applied over or under the content 166, 170, 172 in the view 102. Similarly, the content 168, 174 that follow the respective content 160-164 can be presented with a particular effect, such as color or shading applied to the content 168, 174, or applied over or under the content 168, 174 in the view 102. The indicators that indicate contextual information also can be applied to the indicators 176, though this need not be the case.

A key 180 also can be presented. The key 180 can be presented in the view 100, in the view 102, or in a third view 106 presented via the user interface. For example, the key 180 can be presented within its own pop up window when the view 102 is presented. The key 180 can describe the meaning of the various indicators that are used within the view 102. For example, the key 180 can describe that the "+" indicator indicates content which has been added, the "−" indictor indicates content which has been removed, and the "*" indicator indicates content that has changed. The key 180 also can describe the indicators that indicate content that is leading (i.e., preceding) content which has been added, removed and/or changed between file versions, and content that is trailing (i.e., following) added, removed and/or changed content.

In addition to the comparison information previously discussed, the view 102 also can include comparison information in the form of metadata 182. In illustration, the metadata 182 can indicate the first file version and the second file version that is being compared to the first file version. The metadata 182 also can indicate the category of file versions with which the second file version is associated and/or the category with which the first file version is associated. The metadata 182 further can indicate when the second file version was created, who created the second file version. The metadata 182 also can indicate any other relevant information, for example when the first file version was created, who created the first file version, etc.

In one aspect of the present invention, the comparison information can be selectively filtered to reduce the volume of the comparison information so that the filtered comparison information will fit within a desired size of the view 102. The size can be a default value, or a user selectable value.

In illustration, chunks of content in the comparison information located prior to the chunk 150, between the chunks 150, 152, between the chunks 152, 154 and following the chunk 154 can be selectively filtered so as not to be displayed within the view 102. The indicators 176 can be presented to indicate that such content has been filtered at the respective locations.

The chunks that are filtered can be chunks that do not contain information which has changed between compared versions of the file, though this need not be the case. For example, chunks contain information which has not significantly changed also can be filtered. Whether changes are significant can be determined based on whether the changes are minor in nature, for example punctuation changes, spelling changes, or the like. Such determination can be based on a suitable algorithm, user preferences, default settings, or the like.

Also, chunks that are smaller in size can be selectively filtered so as to not be presented in the view 102. In illustration, the original sizes of the chunks can be determined, and chunks having sizes that are smaller, or smallest, relative to other chunks can be filtered.

Content within a chunk also can be removed. For example, content within the chunk 154 can be selectively filtered so as to not be displayed within the view 102, and an indicator 176 can be presented to indicate that such content has been filtered. For example, the number of lines contained in a chunk can be determined and compared to a threshold value. When the number of lines exceeds the threshold value, lines can be selectively removed from the chunk. The lines that are removed can be lines at a beginning of the chunk, lines within a middle portion of the chunk, and/or lines at an end of the chunk. The threshold value can be a default value or a user selected value.

In one arrangement, the selective filtering of the comparison information can be performed in a particular order, and filtering can be applied on a step-by-step basis until the comparison will fit within a desired size of the view 102. The order in which the selective filtering is applied can be determined based on a default setting, or determined based on a user selection or user preferences. Indeed, the filtering can be applied in the order described above, but this need not be the case.

When a user desires to view filtered content, the user can select the appropriate indicator 176 at the location where the filtered content is located within at least one of the compared file versions. In response to such selection, the view 102 can be expanded to present the filtered content associated with the selected indicator 176. In another embodiment, a fourth view 108 can be presented via the user interface to present the filtered content associated with the selected indicator. For example, if the user selects the indicator 176 located between the chunks 150, 152, content within at least one of the file versions being compared that is located between the chunks 150, 152 can be presented in the view 108.

A user also can choose to view unfiltered comparison information. For instance, the user can select a menu item, icon or button, or provide any other recognizable gesture, that causes the view 102 to expand as necessary to depict all of the difference information, and/or a scroll bar or scroll bars can be presented within the view 102 to allow a user to navigate the unfiltered difference information. In another arrangement, when the user selects to view the unfiltered difference information, a new view (not shown) can be presented which includes all of the comparison information.

Figure 2:
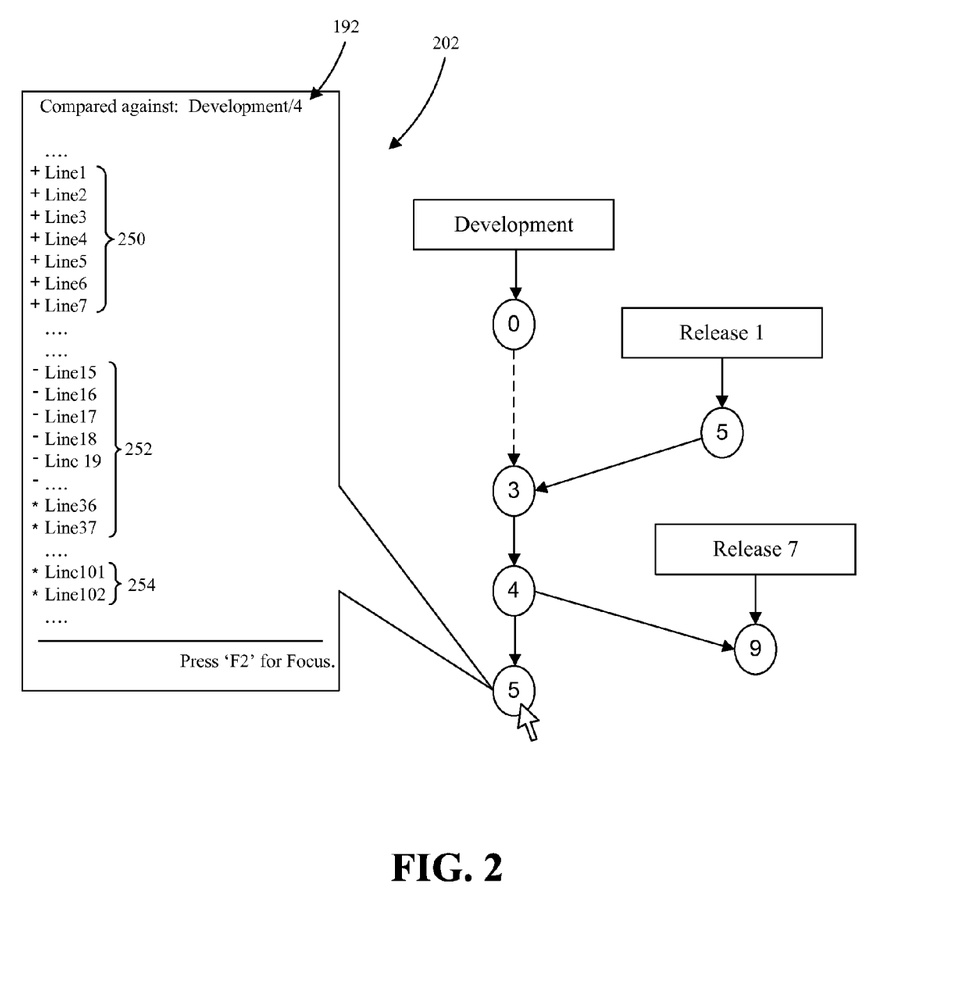
FIG. 2 depicts views presented via a user interface in accordance with another embodiment of the present invention.

FIG. 2 depicts views presented via a user interface in accordance with another embodiment of the present invention. The view 202 is similar to the view 102 described in FIG. 1. However, in comparison to the view 102, the comparison information can be filtered to a greater extent. For example, the view 202 can forego content that provides informational context and only present chunks 250, 252, 254 and/or certain portions of the chunks 250-254 that differ between the file versions being compared.

In addition, the metadata associated with the compared file versions can be selectively filtered, and filtered metadata 192 can be presented in the view 202. For example, the metadata 192 that is presented can be limited to comparison information that indicates the first file version against which the second file version is being compared. Of course, the metadata can be filtered in any other suitable manner and the invention is not limited in this regard.

Figure 3:
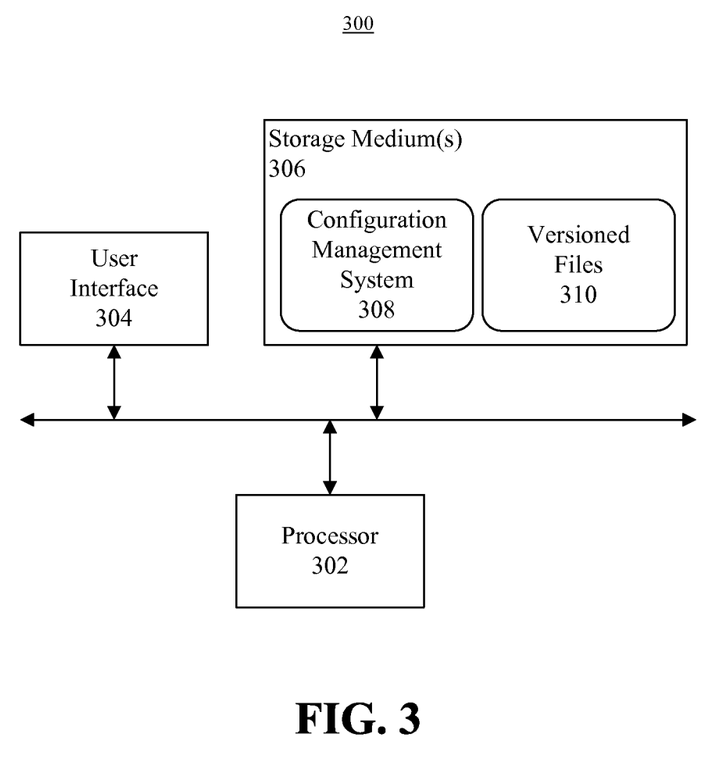
FIG. 3 depicts a system that displays changes to versioned files in accordance with another embodiment of the present invention.

FIG. 3 depicts a system 300 that displays changes to versioned files in accordance with another embodiment of the present invention. The system 300 can include at least one processor 302 coupled to a user interface 304 and at least one storage medium 306, for example through a system bus and/or a communication network. The user interface 304 can comprise, for example, a display, a mouse, a keyboard, a microphone, loudspeakers and/or any other devices that present information to a user and receive information from a user. As noted, the display can be a touch screen, though this need not be the case.

The system 300 can store program code within storage medium(s) 306, and retrieve computer program code from the storage medium(s) 306. The processor 302 can execute the program code accessed from storage medium(s) 306. In one aspect, for example, the system 300 can be implemented as computer that is suitable for storing and/or executing program code. It should be appreciated, however, that system 300 can be implemented in the form of any system comprising one or more processors and memory that is capable of performing the functions described within this specification. Moreover, the system 300 can be distributed among one or more devices. For example, the system 300 can be distributed among one or more computing systems located in different locations.

The system 300 also can include one or more cache memories (not shown) that provide temporary storage of at least some program code in order to reduce the number of times program code must be retrieved from bulk storage device during execution. The system 300 also can include one or more network adapters (not shown), that enable the system 300 to become coupled to other systems. Modems, cable modems, and Ethernet cards are examples of different types of network adapters that can be used with the system 300, but the present invention is not limited to these specific examples.

As pictured in FIG. 3, the storage medium(s) 306 can store a configuration management system (CMS) 308, which may be implemented in the form of executable program code. The CMS 308 can be executed by the processor 302 and/or executed by another processor communicatively linked to the system 300. The storage medium(s) 306 also can store versioned files 310, each of which represents a particular version of a file.

In operation, the CMS 308 can be executed to compare different versions 310 of a file, and present comparison information related to such comparison to a user via the user interface 304. More particularly, the CMS 308 can implement processes to generate the various views previously described with respect to FIGS. 1 and 2. An example of such process is described in the following flowchart, although the invention is not limited to this specific example.

Figure 4:
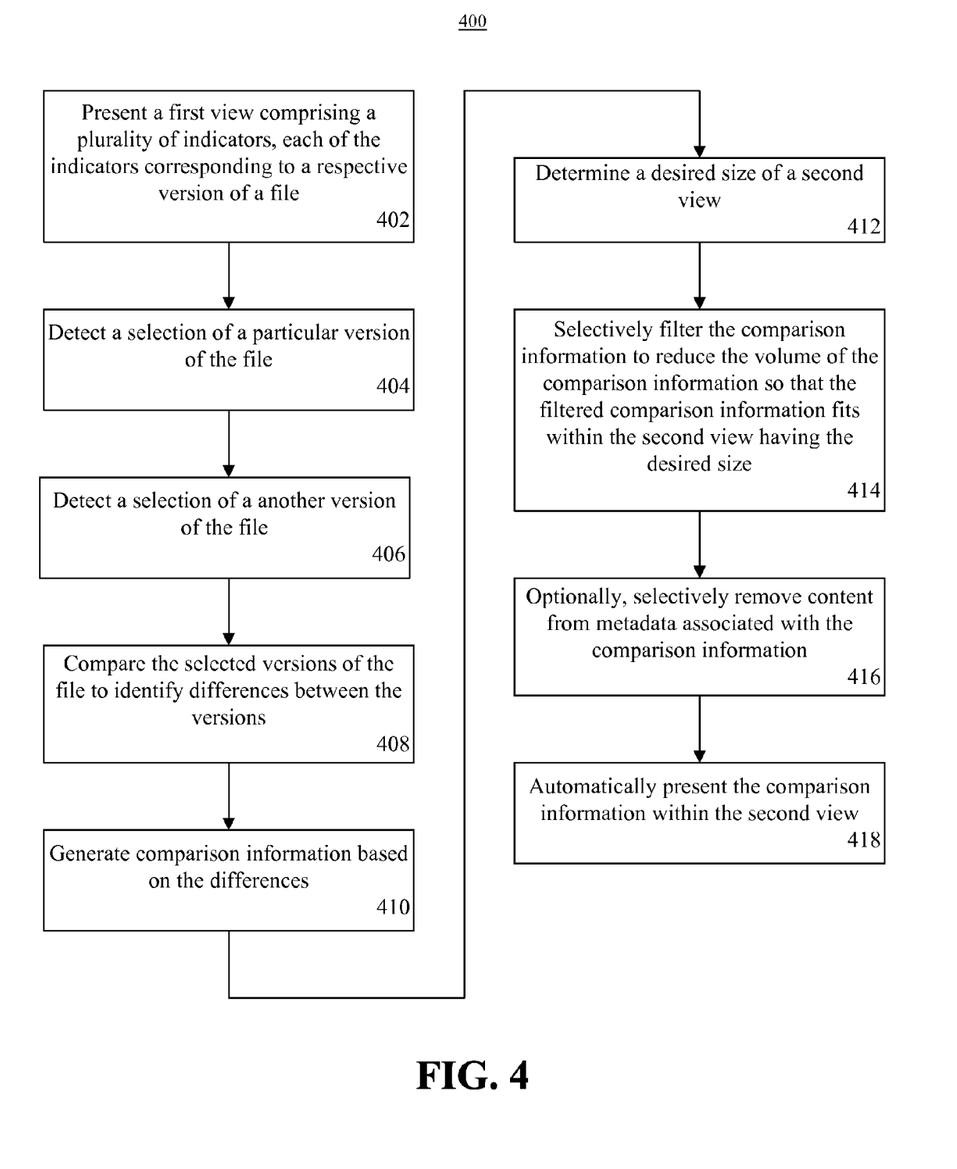
FIG. 4 is a flowchart for a method of presenting changes to versioned files in accordance with one embodiment of the present invention.

FIG. 4 is a flowchart for a method 400 of presenting changes to versioned files in accordance with one embodiment of the present invention. At step 402, a first view can be presented via the user interface. The first view can comprise a plurality of indicators, each of which correspond to respective version of a file. In one arrangement, the plurality of indicators can be presented in a hierarchical manner that indicates relationships between the different versions of the file.

At step 404, a selection of a particular version of the file can be detected. At step 406, a selection of another version of the file can be detected. At step 408, the selected versions of the file can be compared to identify differences between the versions. At step 410, comparison information can be generated based on the differences. At step 412, a desired size of a second view can be determined. The second view can be a view in which the comparison information is to be presented.

At step 414, the comparison information can be selectively filtered to reduce the volume of the comparison information so that the filtered comparison information fits within the second view having the desired size. Optionally, at step 416, content from the metadata associated with the comparison information can be selectively removed. At step 418, the comparison information can be automatically presented within the second view via the user interface.

Like numbers have been used herein to refer to the same items throughout this specification, unless otherwise noted.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising: a computer readable memory having stored thereon computer readable program code that, when executed by a system comprising a processor and a memory, presents changes to versioned files, the computer readable storage medium comprising: computer readable program code that presents a first view comprising a plurality of indicators, each of the indicators corresponding to a respective version of a file, wherein the plurality of indicators are presented in a hierarchical manner that indicates relationships between the different versions of the file; computer readable program code that detects a selection of a particular version of the file; computer readable program code that detects a selection of another version of the file; computer readable program code that, in response to the selection of the other version of the file: compares the versions of the file to identify differences between the versions, and generates comparison information based on the differences; determines a desired size of a second view; selectively filters the comparison information to reduce the volume of the comparison information so that the filtered comparison information fits within the second view having the desired size; and automatically presents the comparison information within the second view;
the comparison information comprises a plurality of chunks;
and the computer program code that selectively filters the comparison information comprises computer program code that selectively removes at least one chunk of the comparison information; and
the computer program code removes a chunk having an original size that is smallest in comparison to sizes of other chunks.

2. The computer program product of claim 1, wherein the computer program code that selectively filters the comparison information comprises computer program code that selectively removes content from at least one chunk of the comparison information.

3. The computer program product of claim 2, wherein the computer program code that selectively removes content from at least one chunk of the comparison information comprises: computer program code that determines a number of lines contained in the chunk; and computer program code that, when the number of lines exceeds a first threshold value selectively removes lines from the chunk.

4. The computer program product of claim 2, further comprising: computer readable program code that presents at least one indicator within the first view where content has been removed; computer readable program code that detects a selection of the indicator; and computer readable program code that presents the removed content in a second view in response to the selection of the indicator.

5. The computer program product of claim 1, wherein the computer program code that selectively filters the information comprises computer program code that selectively removes content from metadata associated with the comparison information.

6. The computer program product of claim 1, further comprising: computer readable program code that presents contextual information with the comparison information to provide context associated with the differences between the versions of the file.

7. The computer program product of claim 6, wherein the contextual information comprises lines within the file immediately preceding or immediately following lines within the file that differentiate the compared versions of the file, wherein the immediately preceding or immediately following lines are unchanged between the compared versions of the file.

8. The computer program product of claim 1, wherein the computer program code that selectively filters the comparison information comprises computer program code that selectively removes content from metadata associated with the comparison information.

9. The computer program product of claim 1, further comprising: computer readable program code that detects a selection to view unfiltered comparison information; and computer readable program code that presents the unfiltered comparison information.

10. A computer program product comprising: a computer readable memory having stored thereon computer readable program code that, when executed by a system comprising a processor and a memory, presents changes to versioned files, the computer readable storage medium comprising: computer readable program code that detects a selection of a particular version of the file; computer readable program code that detects a selection of another version of the file; computer readable program code that compares the selected versions of the file to identify differences between the versions, and generating comparison information based on the differences; computer readable program code that determines a desired size of a first view in which the comparison information is to be presented; computer readable program code that selectively filters the comparison information to reduce the volume of the comparison information so that the filtered comparison information fits within the first view having the desired size; and computer readable program code that automatically presents the filtered comparison information within the first view;
the comparison information comprises a plurality of chunks;
and the computer program code that selectively filters the comparison information comprises computer program code that selectively removes at least one chunk of the comparison information; and
the computer program code removes a chunk having an original size that is smallest in comparison to sizes of other chunks.

* * * * *